(12) United States Patent
Lopes et al.

(10) Patent No.: US 9,244,838 B2
(45) Date of Patent: Jan. 26, 2016

(54) SYSTEM, METHOD, AND COMPUTER-READABLE MEDIUM FOR GROUPING DATABASE LEVEL OBJECT ACCESS COUNTS PER PROCESSING MODULE IN A PARALLEL PROCESSING SYSTEM

(75) Inventors: Arthur Vargas Lopes, San Diego, CA (US); Jeffrey Shelton, San Diego, CA (US); Douglas Brown, Rancho Santa Fe, CA (US); Thomas Julien, San Diego, CA (US); Frank Roderic Vandervort, Ramona, CA (US)

(73) Assignee: Teradata US, Inc., Dayton, OH (US)

( * ) Notice: Subject to any disclaimer, the term of this patent is extended or adjusted under 35 U.S.C. 154(b) by 2072 days.

(21) Appl. No.: 12/346,915

(22) Filed: Dec. 31, 2008

(65) Prior Publication Data

US 2010/0169302 A1 Jul. 1, 2010

(51) Int. Cl.
*G06F 17/30* (2006.01)
*G06F 12/08* (2006.01)

(52) U.S. Cl.
CPC ........ *G06F 12/0804* (2013.01); *G06F 12/0866* (2013.01); *G06F 17/30489* (2013.01)

(58) Field of Classification Search
CPC ............ G06F 12/0808; G06F 12/0817; G06F 12/0891; G06F 12/0804; G06F 12/0866; G06F 17/30489
See application file for complete search history.

(56) References Cited

U.S. PATENT DOCUMENTS

2007/0174241 A1* 7/2007 Beyer .................. G06F 17/2241

* cited by examiner

*Primary Examiner* — Christyann Pulliam
*Assistant Examiner* — Mellissa M Ohba
(74) *Attorney, Agent, or Firm* — Steven McDonald; James Stover

(57) ABSTRACT

A system, method, and computer-readable medium for grouping of database object access counts per processing module in a parallel processing system. Each processing module manages an intermediate cache allocated thereto that stores database object access counts local to the respective processing module. The processing modules are configured in a hierarchical configuration. The intermediate caches managed by the processing modules at the lowest level of the configuration are forwarded to a parent processing module and merged with the intermediate cache allocated to the parent processing module. A root processing module merges the intermediate caches received from one or more parent processing modules with the root processing module's intermediate cache to generate a final cache. An objects access count data structure is then generated by the root processing module.

20 Claims, 14 Drawing Sheets

700 ⟶

| Object ID 702 | Access Count 704 | Last Access Time Stamp 706 | Access ID 708 |

| Object Name 802 | Unique ID 804 | Object Type 806 |

| Last Access Time 902 | Last Access Date 904 |

| Access Type 1002 | Unique ID 1004 |

| Object ID 1102 | Access Count 1104 | Last Access Time Stamp 1106 | Database ID 1108 |

| Database Name 1202 | Unique ID 1204 |

Figure 12

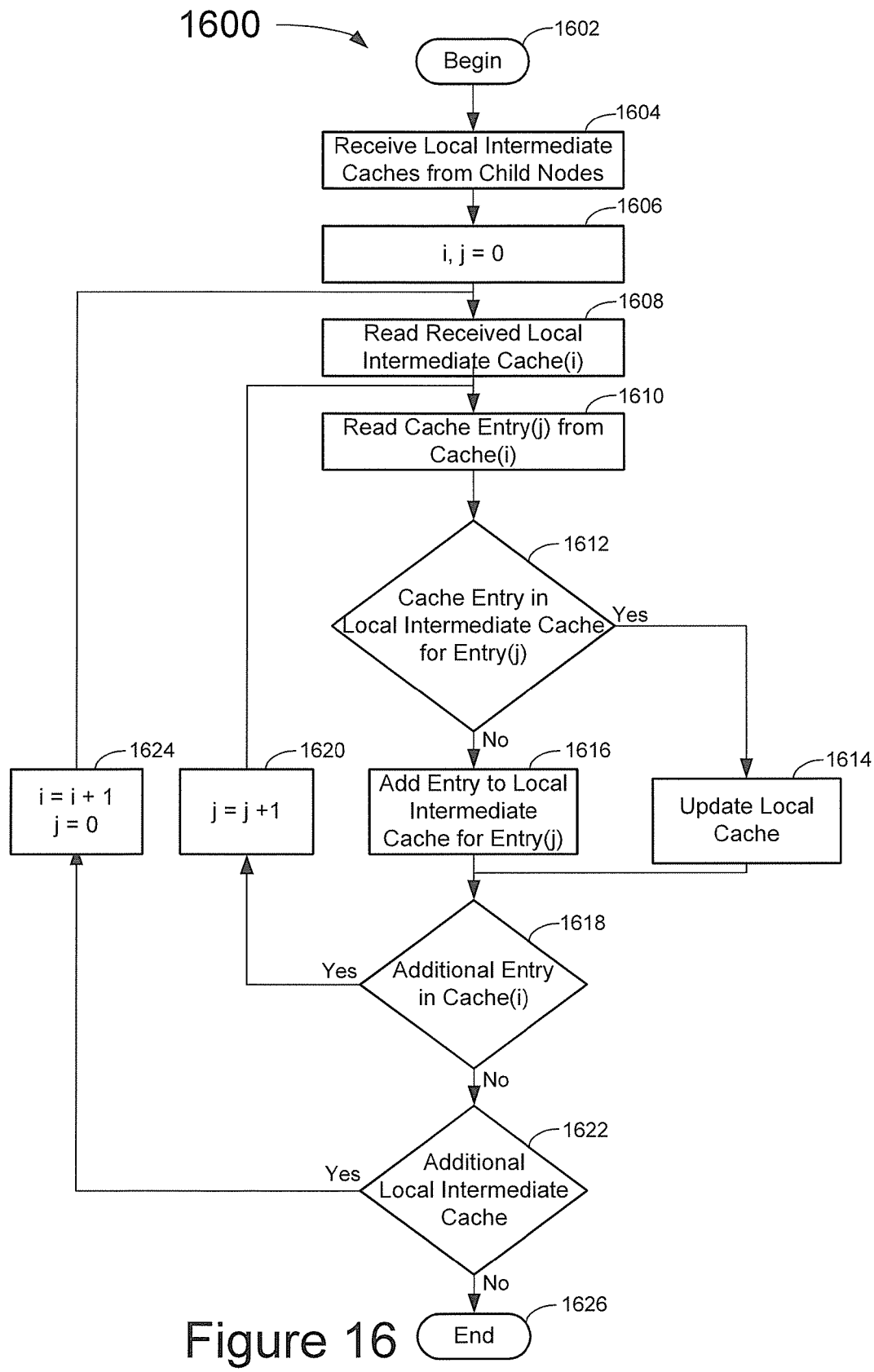

SYSTEM, METHOD, AND COMPUTER-READABLE MEDIUM FOR GROUPING DATABASE LEVEL OBJECT ACCESS COUNTS PER PROCESSING MODULE IN A PARALLEL PROCESSING SYSTEM

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Database systems may store large amounts of data and other objects. Some of the objects may be used more frequently than other objects. Often, it is desirable for a database administrator (DBA) to know which database objects are used rarely, or not at all. This information may allow the administrator to more efficiently store the database objects or even purge unused database objects from the database system. Likewise, it is often desirable for the database administrator to know which database objects are used most frequently than other objects. Based on this information, the most-frequently-used database objects may advantageously be indexed. Database usage statistics are also useful in a closed-loop feedback environment.

Contemporary Database Object Use Count (DOUC) features provide a mechanism for a DBA to determine the frequency of use of database objects. This information can be used to identify obsolete or dormant objects that may be dropped to save disk space, utilized to generate indexes on frequently used objects to reduce the requisite search space, and provide other various advantages. The DOUC feature collects object use data and stores the information in a Data Dictionary for ease of reporting. Because it is integrated with the database it has the ability to count objects referenced in the SQL text as well as in the query execution plan.

Current implementations of DOUCs provide a general method for collecting, merging, sorting and storing aggregated counts with associated timestamps in the data dictionary. However, current DOUC implementations may result in system bottlenecks at a parsing engine due to the use of nested linked lists and sorting of DOUC data.

SUMMARY

Disclosed embodiments provide a system, method, and computer readable medium that facilitate fast and efficient grouping of database object access counts per processing module in a parallel processing system. Each processing module manages an intermediate cache allocated thereto that stores database object access counts local to the respective processing module. The processing modules are configured in a hierarchical configuration and processing modules at the lowest level of the configuration forward their respective intermediate cache to a processing module configured as a parent to the respective processing module. On receipt of intermediate cache(s) from lower level processing modules, a processing module merges the received intermediate caches with the intermediate cache allocated to the processing module. The process is iteratively repeated until a root processing module receives the intermediate caches from processing modules configured as child nodes thereto. The root processing module merges the received intermediate cache(s) with the root processing module's intermediate cache thereby generating a final cache. An objects access count data structure aggregated from each processing module is then generated by the root processing module. The object access count data structure includes data blocks of object access counts where each data block is associated with a particular object kind. The data blocks may then be forwarded to the associated root processing module.

BRIEF DESCRIPTION OF THE DRAWINGS

Aspects of the present disclosure are best understood from the following detailed description when read with the accompanying figures, in which:

FIG. 7 depicts a diagrammatic representation of an example entry in a local intermediate cache in accordance with an embodiment;

FIG. 8 is a diagrammatic representation of an object ID of a cache entry in accordance with an embodiment;

FIG. 9 is a diagrammatic representation of a last-access-time stamp of a cache entry in accordance with an embodiment;

FIG. 10 is a diagrammatic representation of an access ID of a cache entry in accordance with an embodiment;

FIG. 11 depicts a diagrammatic representation of an alternative cache entry implemented in accordance with an embodiment;

FIG. 12 depicts a diagrammatic representation of an example database ID of a cache entry implemented in accordance with an embodiment;

FIG. 16 is a flowchart of a local intermediate cache merge routine implemented in accordance with disclosed embodiments;

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, fast and efficient grouping counts per processing module mechanisms are provided before the database object access counts are sent to each participating processing module thereby eliminating a final sort step at a last parsing engine. The database object access count receiver in each processing module (AMP) performs a sort on the counts to speed up disk access time. In this manner, the last parsing engine (PE) does not create a bottleneck by consuming valuable system resources. The processing time is also reduced by replacing the nested linked list data structure by a set of hash table data structures (each dedicated to a specific object kind). Here the time complexity of a nested linked list, for operations like lookup/update and insert, is O(N) and for the set of hash tables is O(1). Further, the disclosed mechanism advantageously exploit the parallel architecture by dividing the remaining work, regarding sorting, among the participating processing modules (AMPs) rather than performing the sorting of all data collected in a final PE.

Figure 1:
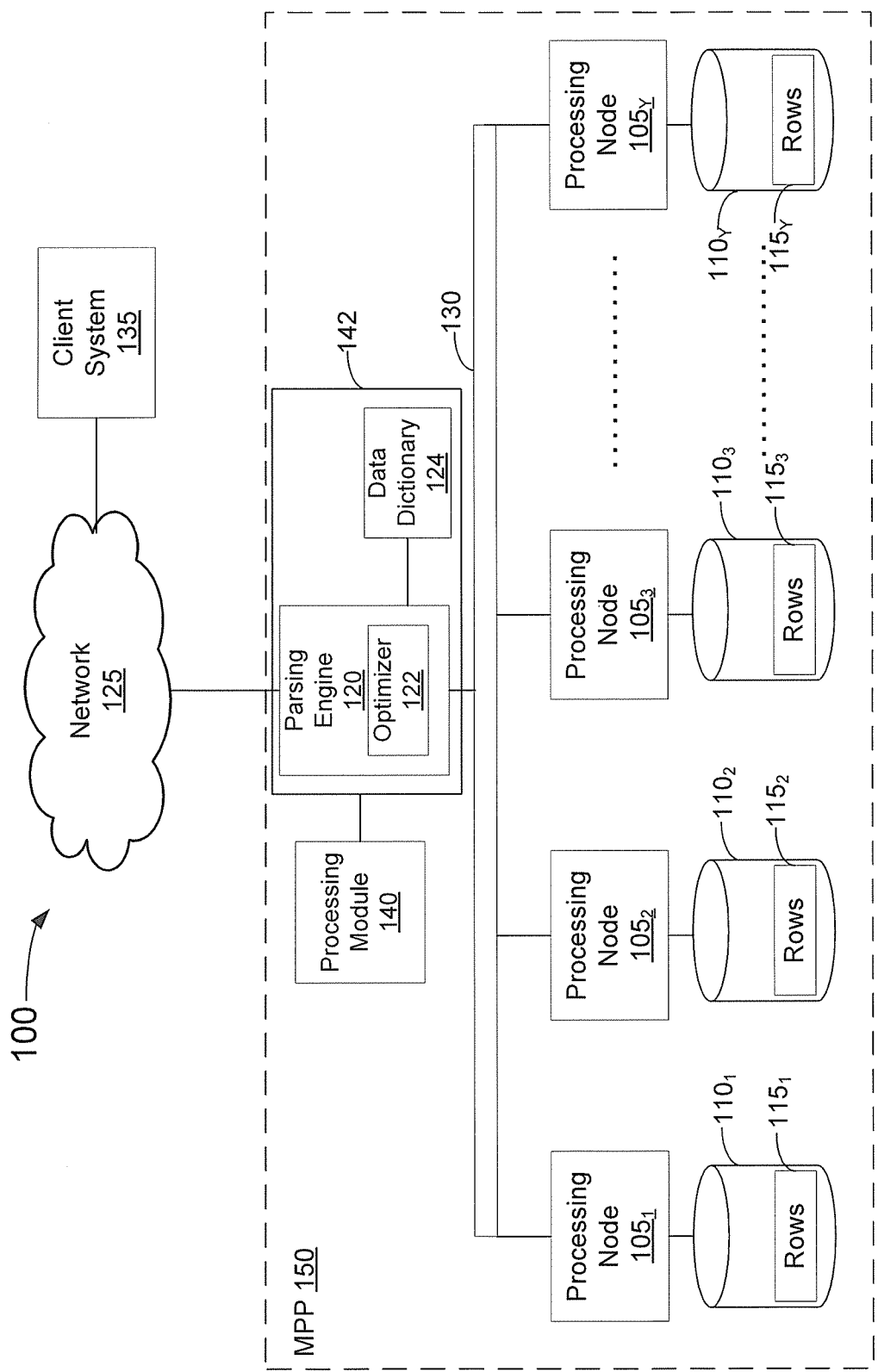
FIG. 1 depicts a diagrammatic representation of an exemplary architecture for a large database system that is suited for implementing mechanisms for grouping database level object access counts per processing module in accordance with disclosed embodiments.

FIG. 1 depicts a diagrammatic representation of an exemplary architecture for a large database system (DBS) 100, such as a Teradata Active Data Warehousing System, that is suited for implementing mechanisms for grouping database level object access counts per processing module in accordance with disclosed embodiments. The database system 100 includes a relational database management system (RDBMS) built upon a massively parallel processing (MPP) system 150.

As shown, the database system 100 includes one or more processing nodes $105_{1 \ldots Y}$ that manage the storage and retrieval of data in data-storage facilities $110_{1 \ldots Y}$. Each of the processing nodes may host one or more physical or virtual processing modules, such as one or more access module processors (AMPs). Each of the processing nodes $105_{1 \ldots Y}$ manages a portion of a database that is stored in a corresponding one of the data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Y}$ of the tables are stored across multiple data-storage facilities $110_{1 \ldots Y}$ to ensure that the system workload is distributed evenly across the processing nodes $105_{1 \ldots Y}$. A parsing engine 120 organizes the storage of data and the distribution of table rows $115_{1 \ldots Y}$ among the processing nodes $105_{1 \ldots Y}$ and accesses processing nodes $105_{1 \ldots Y}$ via an interconnect 130. The parsing engine 120 also coordinates the retrieval of data from the data-storage facilities $110_{1 \ldots Y}$ in response to queries received from a user, such as one using a client computer system 135 connected to the database system 100 through a network 125 connection. The parsing engine 120, on receiving an incoming database query, applies an optimizer 122 component to the query to assess the best plan for execution of the query. Selecting the optimal query-execution plan includes, among other things, identifying which of the processing nodes $105_{1 \ldots Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The database system typically receives queries in a standard format, such as the Structured Query Language (SQL) put forth by the American National Standards Institute (ANSI). The parsing engine 120, the optimizer 122, and the data dictionary 124 may be implemented as computer-executable instruction sets tangibly embodied on a computer-readable medium, such as a memory device 142, that are retrieved by a processing module 140 and processed thereby.

Figure 2:
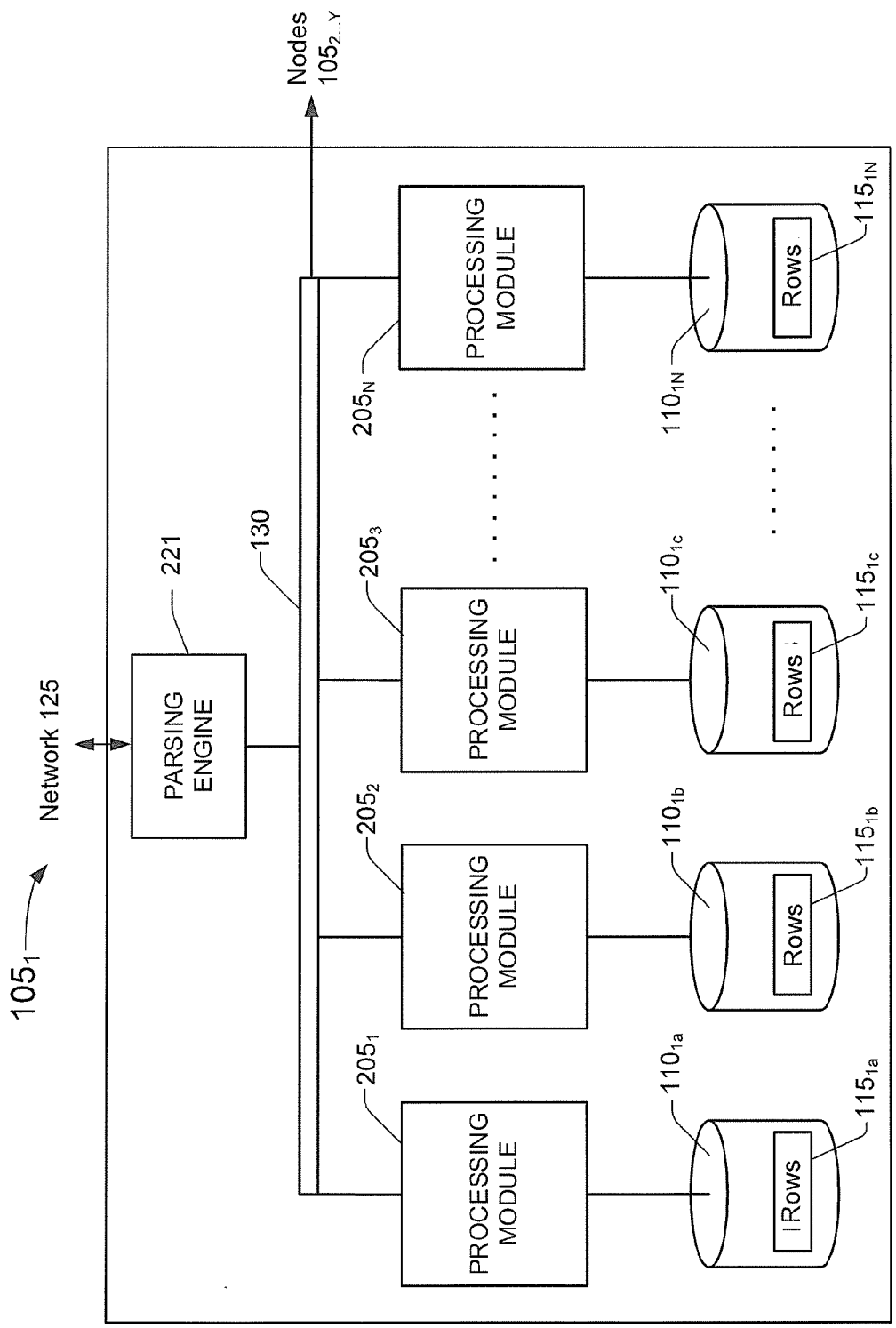
FIG. 2 depicts a diagrammatic representation of a sample architecture for one node of the database system depicted in FIG. 1 implemented in accordance with disclosed embodiments.

FIG. 2 depicts a diagrammatic representation of a sample architecture for one node $105_1$ of the DBS 100. The DBS node $105_1$ includes one or more processing modules $205_{1 \ldots N}$ connected by an interconnect 130 that manage the storage and retrieval of data in data-storage facilities $110_{1a \ldots 1N}$. Each of the processing modules $205_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $205_{1 \ldots N}$ manages a portion of a database that is stored in a corresponding one of the data-storage facilities $110_{1a \ldots 1N}$. Each of the data-storage facilities $110_{1a \ldots 1N}$ includes, for example, one or more disk drives. The DBS may include multiple nodes $105_{2 \ldots Y}$ in addition to the illustrated node $105_1$, connected by way of the interconnect 130.

The system stores data in one or more tables in the data-storage facilities $110_{1a \ldots 1N}$. The rows $115_{1a \ldots 1N}$ of the tables are stored across multiple data-storage facilities $101_{1a \ldots 1N}$ to ensure that the system workload is distributed evenly across the processing modules $205_{1 \ldots N}$. A parsing engine 221 organizes the storage of data and the distribution of table rows $110_{1a \ldots 1N}$ among the processing modules $205_{1 \ldots N}$. The parsing engine 221 also coordinates the retrieval of data from the data-storage facilities $110_{1a \ldots 1N}$ in response to queries received from a user at a client computer system 135. The DBS 100 usually receives queries and commands to build tables in a standard format, such as SQL.

In one implementation, the rows $115_{1a \ldots 1N}$ are distributed across the data-storage facilities $110_{1a \ldots 1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a...1N}$ and associated processing modules $205_{1...N}$ by a hash bucket map. The characteristics of the columns chosen for the primary index determine how evenly the rows are distributed.

Figure 3:
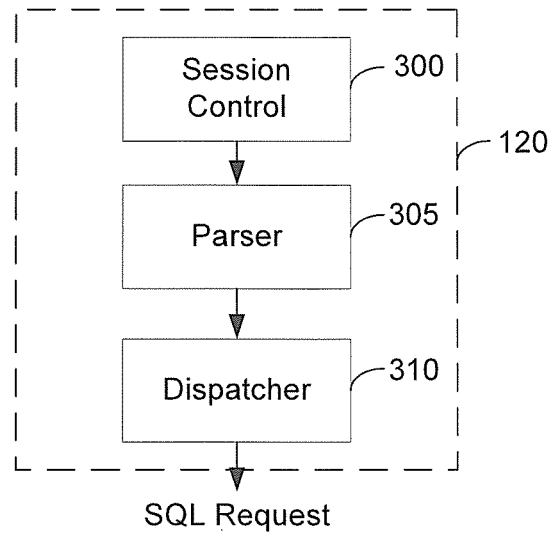
FIG. 3 is a diagrammatic representation of a parsing engine implemented in accordance with an embodiment.
Figure 4:
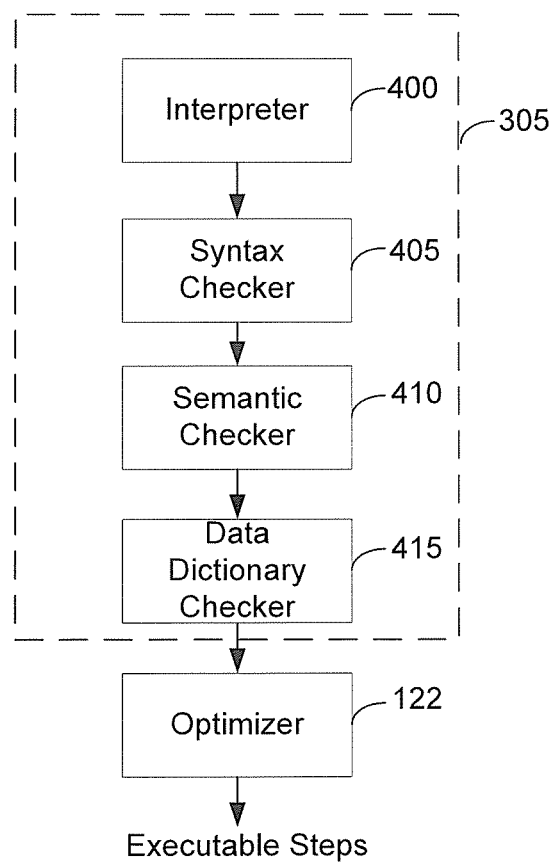
FIG. 4 is a diagrammatic representation of a parser implemented in accordance with an embodiment.

In one example system, a parsing engine, such as the parsing engine 120 depicted in FIG. 1, is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults the data dictionary 124 depicted in FIG. 1 to ensure that all of the objects specified in the SQL request exist and that the user has the authority to perform the request (block 415). Finally, the parser 305 runs the optimizer 122 that selects the least expensive plan to perform the request.

In addition to storing data in tables, the DBS may store other objects, including, but not limited to, one or more views, one or more indexes, one or more macros, one or more stored procedures, one or more triggers, one or more User Defined Functions ("UDFs"), and other objects. Each of the objects in the database may be related to one or more other objects stored in the database. For example, an index may reference one or more columns in one or more tables; a trigger may be invoked when an element in one or more columns of one or more tables is updated; a stored procedure may operate on one or more columns of one or more tables; and a view may include one or more columns from one or more tables. The columns are adapted to store different data types including conventional data types (e.g., strings (varchar), integers, floating- or fixed-point decimals) and large object types (e.g., Large Objects (LOBs), Binary Large Objects (BLOBs) and Character Large Objects (CLOBs)).

Some objects in the DBS may be used more frequently than others. It may be desirable for the DBA to know which objects are used most frequently or most recently, or, conversely which objects are least used or unused recently. To this end, the DBS may collect and store statistics about when and how often objects are accessed. Each of the parsing engines in the DBS maintains a local intermediate database-object-use cache ("local intermediate cache") to collect and store statistics about database object usage. The system described herein consolidates the local intermediate caches into a final cache that is used to update a data dictionary that stores the statistics.

Figure 5:
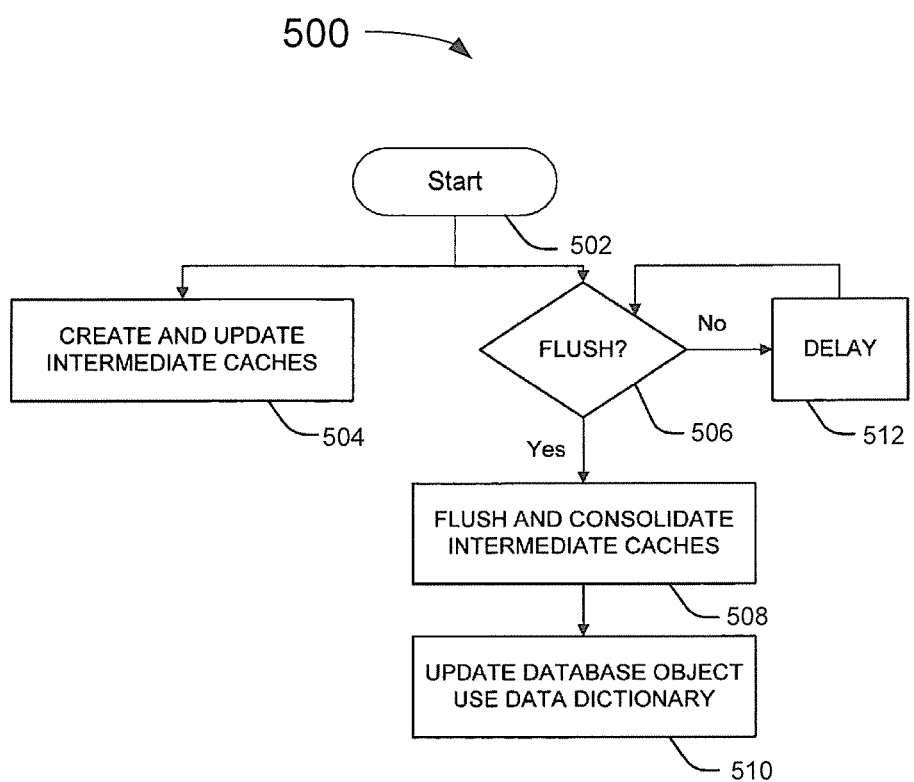
FIG. 5 is a flowchart that depicts processing of routine for collecting, aggregating, and storing database-object-use statistics implemented in accordance with an embodiment.

FIG. 5 is a flowchart 500 that depicts processing of a routine for collecting, aggregating, and storing database-object-use statistics implemented in accordance with an embodiment. The processing steps of FIG. 5 may be implemented as computer-executable instructions tangibly embodied on a computer-readable medium executable by a processing system, such as one or more of the processing modules 140 and processing nodes $105_1$-$105_Y$ depicted in FIG. 1.

The objects use statistics routine is invoked (step 502), and creates and updates one or more local intermediate caches (step 504). The system determines whether it should flush the intermediate caches (block 506). If the system determines that it should flush the intermediate caches, it flushes and consolidates the one or more intermediate caches into a final cache (block 508). The system updates the database-object-use dictionary to reflect the entries in the final cache (block 510). The database-object-use dictionary may be implemented as a data dictionary including multiple tables that are updated to reflect the final cache. If, at step 506, the system determines that it should not flush the intermediate caches, the system delays (step 512) and returns to step 506.

Although the system processing is illustrated in a linear manner in FIG. 5, in operation portions of the system may operate simultaneously and redundantly. For example, the system continues to create and update the local intermediate caches at step 504 while other portions of the system are operating. Further, steps 506-512 may run in more than one instance. After the system flushes the local intermediate caches according to step 508, it will continue to determine if the local intermediate caches need to be flushed according to step 506 even while the local intermediate caches are consolidated according to step 508 and the data dictionary is updated according to step 510. In some situations, the system may try to update the data dictionary with more than one final cache simultaneously. One example system uses pipeline parallelism to implement the system processing shown in FIG. 5. The structure of the system in FIG. 5 is simply meant to show that the data dictionary is updated after one final cache is created by flushing and consolidating the local intermediate caches. Similarly, the local intermediate caches are not flushed and consolidated before they have been created and updated. Therefore, FIG. 5 illustrates the interactions between processes in a DBS, rather than providing an exact roadmap for performing a monolithic process.

Figure 6:
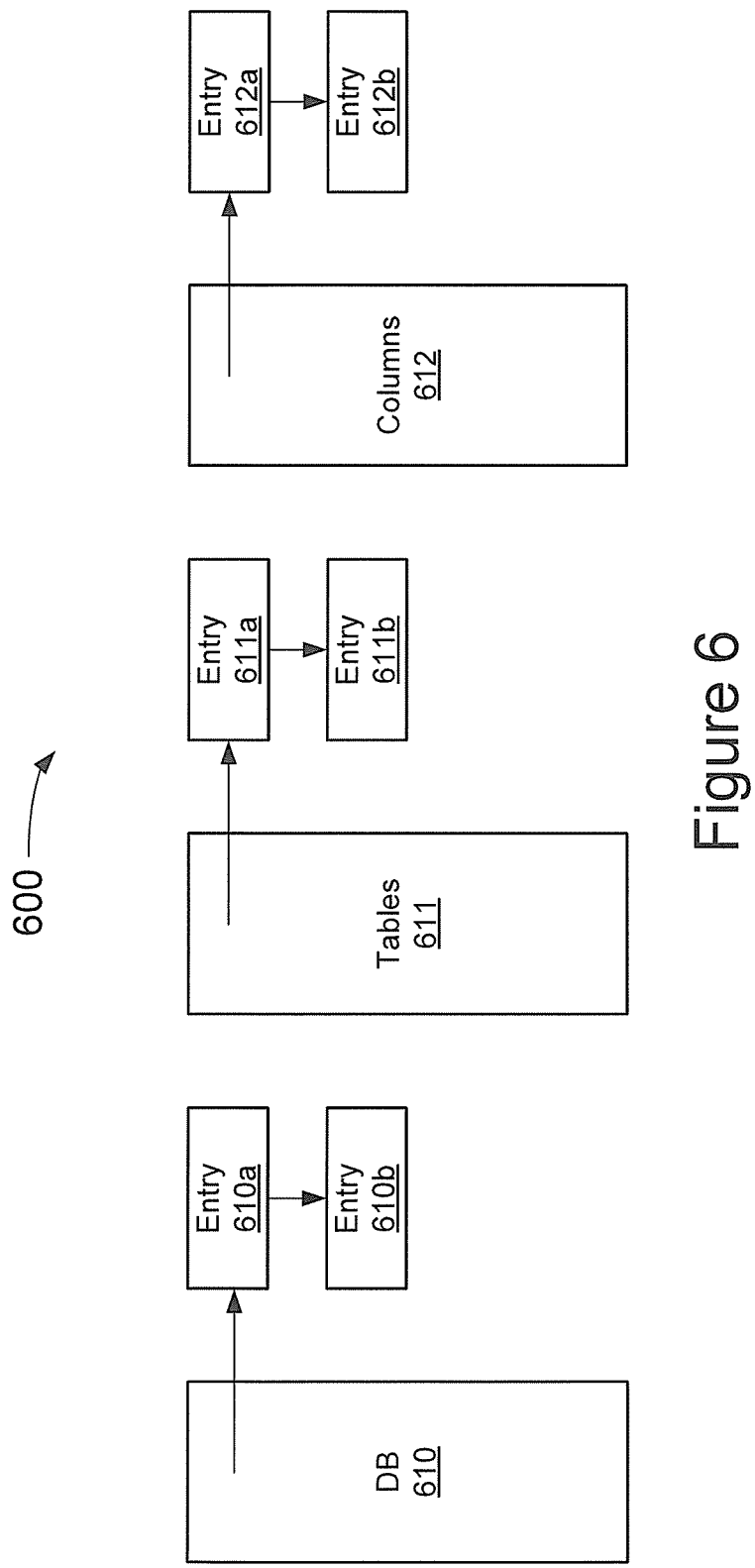
FIG. 6 is a diagrammatic representation of a local intermediate cache for collecting object use counts in accordance with disclosed embodiments.

The local intermediate caches may include any data structure capable of storing database cache entries. In one example system, each of the local intermediate caches may include a data structure 600 implemented in accordance with an embodiment comprising various hash table data structures as depicted in FIG. 6.

The data structure 600 includes cache entries 610a-610b-612a-612b for each object accessed by a particular parsing engine. After a parsing engine has received all counts from its child parsing engines, each of these entries will contain the final access count for this particular object associated with a time stamp up to its level in the parsing engine hierarchy. The entries may be allocated for, by way of example, databases tables, columns, indexes, or any variety of other objects, such as views, macros, stored procedures, UDFs, and other objects stored in the DBS 100.

In the illustrative example, the data structure 600 includes various hash tables 610-612 that each maintains linked lists of respective entries 610a-610b-612a-612b. All such entries share a common hash value. Each hash table is associated with a particular object type. In the illustrative example, the hash table 610 comprises entries 610a-610b for respective counts of database accesses. For instance, the entry 610a may include a count for accesses of a particular database and associated timestamp(s). The entry 610a may be linked to another entry 610b that stores a count and timestamp for accesses of another database. Any number of entries may be included in the hash table 610, and the depicted example of entries 610a-610b is illustrative only and is provided to facilitate an understanding of the disclosed embodiments. In a similar manner, the hash table 611 may include entries 611a-611b that respectively store counts and timestamps of accesses to a particular table. Likewise, the hash table 612 may store entries 612*a*-612*b* that receptively store counts and timestamps of accesses to particular columns.

The exemplary hash tables 610-612 and corresponding entries 610*a*-610*b*-612*a*-612*b* are exemplary only, and the data structure 600 may include hash tables and corresponding entries for any variety of database objects, including:

User defined aggregate function (Agg)
User defined aggregate STAT function (AgS)
Security Authorization (Aut)
Column (Col)
Database (DB)
Hash Index (Hix)
Index (Idx)
Join Index (JIx)
Journal (Jrl)
Macro (Mac)
No Type (Unknown) (NoT)
Stored Procedure (SP)
User defined STAT function (Sta)
Table (Tab)
Table function (TbF)
Temporary (Tmp)
Trigger (Trg)
User defined function (UDF)
User defined method (UDM)
User defined type (UDT)
View (Viw)
Volatile (Vol)
External Stored Procedure (XSP)

FIG. 7 depicts a diagrammatic representation of an example entry 700 in a cache data structure 600 implemented in accordance with an embodiment. Cache entry 700 includes an object ID 702 (which is shown in greater detail in FIG. 8), an access count 704, a last-access-time stamp 706 (which is shown in greater detail in FIG. 9), and an access ID 708 (which is shown in greater detail in FIG. 10).

An example object ID 702, depicted in FIG. 8, includes an object name 802, a unique object ID 804, and an object type 806. In one example object ID 702, the object name 802 stores the name of the object. In another example object ID 702, the object name 802 includes multiple fields to store the name of the object and the names of related objects. For example, if the object is a column, the object name 802 records the name of the column, the name of the associated table, and the name of the associated database. Storing the names of these related provides more information about the object for which statistics are being recorded, and in certain situations may speed the analysis of the statistics. Omitting the multiple fields in the object name 802 and recording only the name of the object, which is done in some example systems, presents less of a burden on system resources, allowing the system to perform statistics collection and analysis more quickly. In another example system, the object name may be omitted entirely, further decreasing the burden on system resources. It is possible to omit the object name 802 because the unique object ID 804 is a string that uniquely identifies the object. The unique object ID 804 is particularly useful in a situation where multiple objects may have the same name. The object type 806 describes the type of the object. For example, the object type 806 may reflect whether the object is a database, a table, a column, an index, a view, a trigger, a stored procedure, a macro, or another type of object.

Referring again to FIG. 7, the access count 704 reflects the number of times the object was locally accessed since the database-object-use cache was last flushed. An example last-access-time stamp 706, shown in FIG. 9, includes a last-access time 902 and a last-access date 904. The last-access time 902 and the last-access date 904 may be stored as separate fields or as a single field. In one example last-access-time stamp 706, the last-access time 902 and last-access date 904 are stored in a single field that reflects the number of seconds since Jan. 1, 1970. In another example last-access-time stamp 706, the last-access time 902 is stored in two fields: an hour field and minute field, and the last-access date 904 is stored in three fields: a month field, a day field, and a year field.

An example access ID 708, shown in FIG. 10, includes an access type 1002 and a unique access ID 1004. The access type 1002 reflects the type of action that lead to the parsing engine accessing the object. For example, if the database object is selected in a SQL request, the access type 1002 field would reflect that the object was selected. In another example, if the object is a column that is checked by the parsing engine as a result of a condition in a WHERE clause of the SQL request, the access type 1002 field will reflect that the column was used by a predicate. The unique access ID 1004 records a unique identifier for the access. In one example system, the unique access ID 1004 is not recorded to save system resources.

FIG. 11 depicts a diagrammatic representation of an alternative cache entry 1100 implemented in accordance with disclosed embodiments. Alternative cache entry 1100 includes the object ID 702 (which was shown in greater detail in FIG. 8), the access count 1104, the last-access-time stamp 706 (which was shown in greater detail in FIG. 9), and a database ID 1108 (which is shown in greater detail in FIG. 12).

FIG. 12 depicts a diagrammatic representation of an example database ID 1108 implemented in accordance with disclosed embodiments. The database ID 1108 includes a database name 1202 and a unique ID 1204. In one example database ID 1108, the database name 1202 records the name of the database and the unique ID 1204 records a unique identification string that identifies the database that the object is associated with. In some example systems, the database name 1202 may be omitted to save space and other system resources. Including the database name 1202, however, may allow for quicker processing of the collected statistics because the system will not have to look up the name of the database associated with the object.

In one example system, cache entries 700 are used for collecting statistics about some object types (e.g., databases, tables, indexes, and columns) while alternative cache entries 1100 are used to collect statistics about other types of objects (e.g., views, macros, stored procedures, triggers, and User Defined Functions (UDFs)). In another example system, only cache entries 700 are used for collecting statistics about database objects. The need to use both cache entries 700 and alternative cache entries 1100 may arise because the system may collect statistics about different types of database objects in different portions of the parsing engine. In one example system, the data dictionary checker (processing of which is depicted with reference to step 415 of FIG. 4) creates and updates alternative cache entries 1100 and the dispatcher (depicted with reference to step 310 of FIG. 3) creates and updates cache entries 700. The statistics for different objects may be maintained by different portions of the parsing engine to most efficiently use system resources. In another example system, all cache entries are cache entries 700 and are maintained in the dispatcher.

Figure 13:
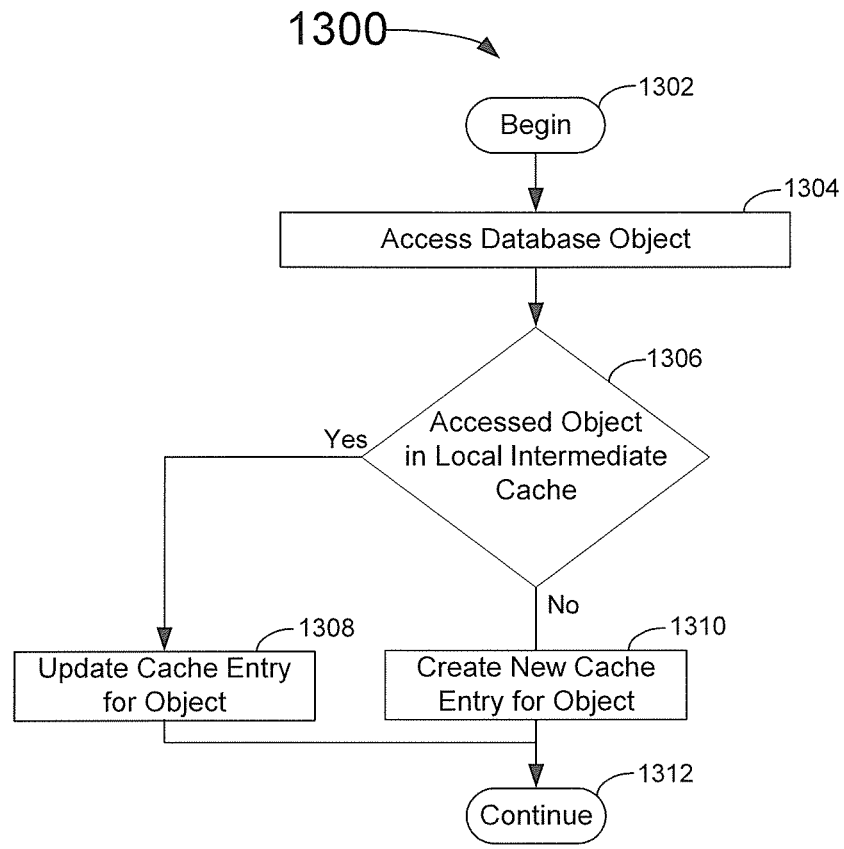
FIG. 13 depicts a flowchart of an exemplary processing routine for creating and updating the local intermediate caches in accordance with an embodiment.

Returning to FIG. 5, at step 504, the parsing engine creates and updates the intermediate caches. An example processing routine for creating and updating the local intermediate caches is shown in the flowchart 504 of FIG. 13. The intermediate cache creation and update routine is invoked (step 1302). The parsing engine processes database queries as described in FIG. 3. Each time the parsing engine accesses a database object (step 1304), the system determines whether there is an entry in its local intermediate cache for the accessed database object (step 1306). If there is an entry in the local intermediate cache for the accessed database object, the system updates the cache entry for the accessed database object in the local intermediate cache (step 1308), and the cache creation and update routine processing may then continue (step 1312). In one example system for updating the entry in the local intermediate cache, the access count 704 of the entry for the accessed object is incremented by one and the current time and date is recorded as the last-access-time stamp 706. If the local intermediate cache does not have an entry for the accessed database object, the system creates an entry in the local intermediate cache for the database object (step 1310), and processing may continue according to step 1312. In one example system where the local intermediate cache is arranged as a set of hash tables in the data structure 600 depicted in FIG. 6, this includes creating a cache entry for the object (e.g., entry 610b implemented according to the depicted cache entry 700 or alternative cache entry 1100 depending on the type of the database object), and creating links to and from the new cache entry. The creation of the new cache entry also includes setting the access count 704 to "1" and setting the last-access-time stamp 706 to the current time.

Returning to FIG. 5, at step 506, the system determines whether to flush the local intermediate caches in the parsing engines. In one example system, the caches will be flushed when one or more caches have reached a threshold size or when a particular period of time has elapsed. If the system determines that the intermediate caches should be flushed, the parsing engines coordinate with each other to flush and consolidate their intermediate caches according to step 508.

Figure 14:
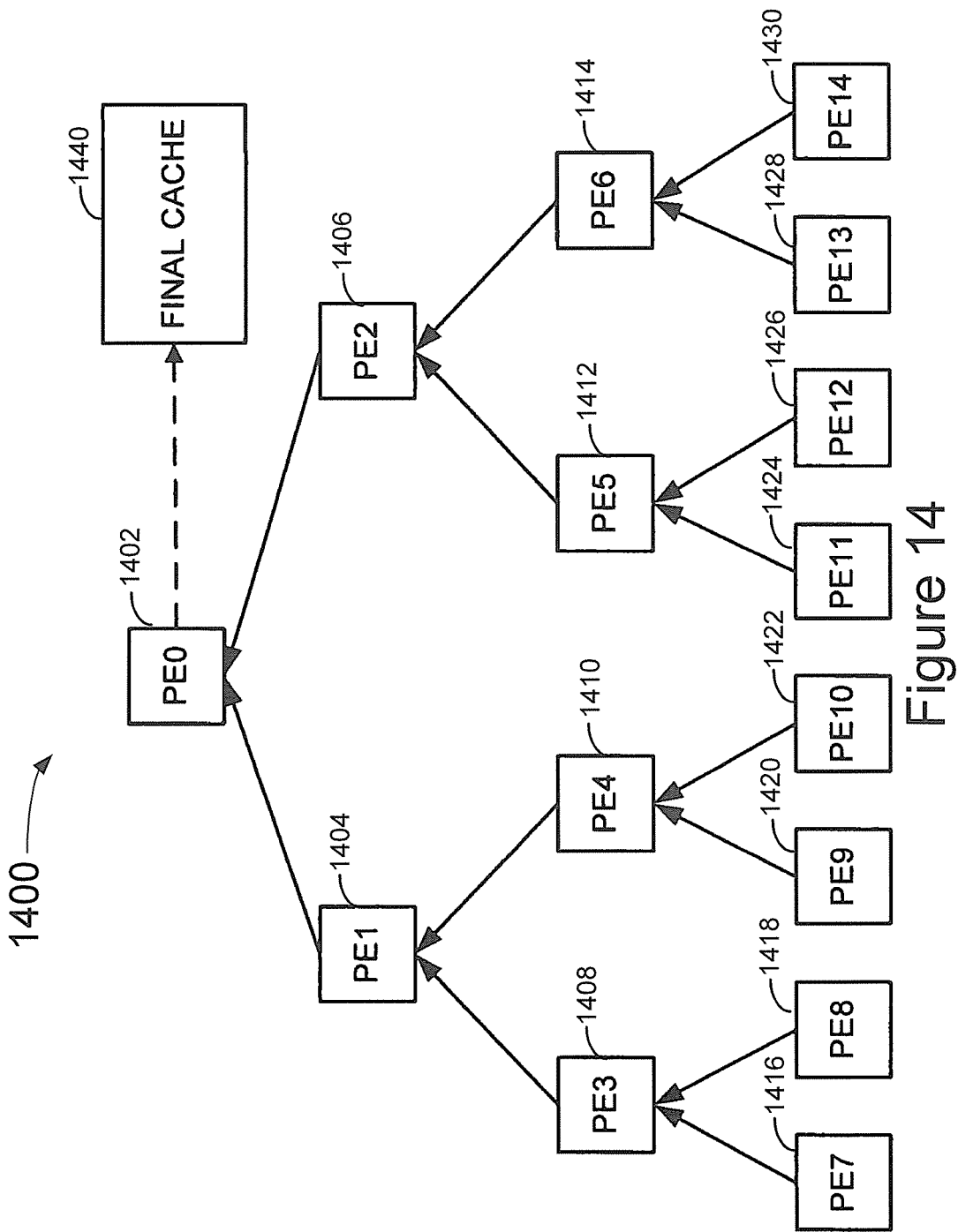
FIG. 14 depicts a diagrammatic representation of a parsing engine configuration for consolidating local intermediate caches in accordance with disclosed embodiments.

An example process for consolidating the local intermediate caches from the parsing engines is depicted in the diagrammatic representation of a parsing engine configuration of FIG. 14 implemented in accordance with disclosed embodiments. Each of the parsing engines 1402-1430 (diagrammatically designated PE0-PE14) in the DBS has a position in a binary tree represented generally by the numeral 1400. In a binary tree, if two nodes are linked (e.g., have a branch between them) then the top node is referred to as a parent node and the bottom node is referred to as the child node. The top node in the tree, which has no parent, is a root node. The nodes without children are leaf nodes. In the binary tree 1400, PE 1402 is the root node and PEs 1416-1430 are leave nodes.

Figure 15:
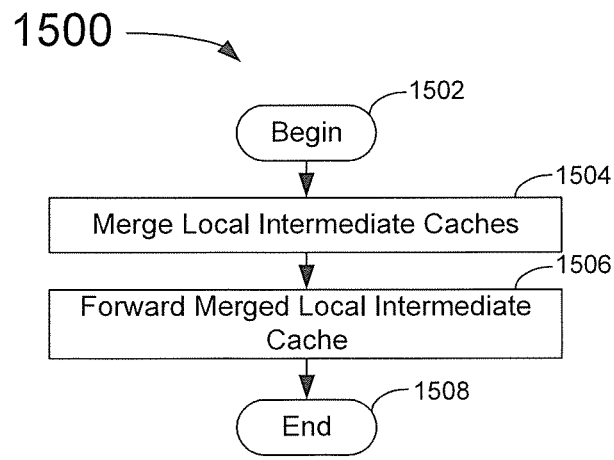
FIG. 15 is a flowchart of an exemplary intermediate cache consolidation and forwarding routine implemented in accordance with disclosed embodiments.

FIG. 15 is a flowchart 1500 of an exemplary intermediate cache consolidation and forwarding routine implemented in accordance with disclosed embodiments. Each of the parsing engines, excluding parsing engines 1416-1430 configured as leaf nodes in the binary tree 1400, will merge its intermediate local cache with intermediate local cache(s) received from child parsing engine nodes (step 1504). After merging the intermediate cache(s) of the child parsing engine nodes with the parent parsing engine's local intermediate cache, the parsing engine forwards its local intermediate cache, now merged with the intermediate cache(s) of its child parsing engine nodes, to its parent node. On receipt of the intermediate caches by a parent node from its child nodes, the parent node will merge the intermediate caches received from the child nodes with the parent node's intermediate cache as described below with reference to FIG. 15. If the parsing engine is a leaf node, the parsing engine does not perform any cache merge operation because the parsing engine will not receive any intermediate caches from child nodes. After a parent node merges the intermediate caches received from child nodes with its intermediate cache, the parent node will forward the merged intermediate cache to its parent node. If the parsing engine is the final root node, the parsing engine does not forward its intermediate cache because the final root node cannot forward its local intermediate cache to a parent node. In the illustrative example, the final root PE 1402 creates the final cache 1440 by merging the intermediate caches from its child PEs 1404-1406 with its own intermediate cache. The final cache 1440 is used to update the data dictionary which is described in greater detail with respect to FIG. 16. Thus, the final cache 1440 is built in a cascading fashion from the caches below it in the binary tree 1400.

FIG. 16 is a flowchart 1600 of a local intermediate cache merge routine implemented in accordance with disclosed embodiments. The merge routine is invoked (step 1602), and a parent parsing engine receives one or more local intermediate caches from its child parsing engine nodes (step 1604). A local intermediate cache index, i, and a local intermediate cache entry index, j, may be initialized (step 1606). A local intermediate cache(i) received from a child parsing engine node is then read (step 1608), and an entry(j) of the local intermediate cache(i) is read (step 1610). The system examines the cache entry(j) of the child's intermediate cache(i) to determine whether there is an existing entry in the local intermediate cache of the parent parsing engine for the database object referenced by the cache entry(j) (step 1612). If there is an entry in the local intermediate cache for the same database object referenced by entry(j), the system updates the local intermediate cache of the parent parsing engine (step 1614) which is discussed in greater detail below. The system may then determine if there is an additional cache entry in the local intermediate cache(i) (step 1618).

Returning again to step 1612, if there is not an entry in the local intermediate cache relating to the database object referenced by the cache entry(j), the system creates a new cache entry in the local intermediate cache of the parent parsing engine for the referenced database object and populates the new cache entry using the cache entry(j) (step 1616). In one example system, this includes copying the object ID 702, the access count 704, and the last-access-time stamp 706 from the entry(j) to the new cache entry. An evaluation is then made to determine if an additional cache entry(j) exists in the local intermediate cache(i) according to step 1618. If an additional cache entry(j) exists in the local intermediate cache(i), the cache entry index j may be incremented (step 1620), and processing returns to read the cache entry(j) from the local intermediate cache(i) according to step 1610. If no additional entries exist in the local cache(i), an evaluation may be made to determine if an additional child intermediate cache remains for evaluation (step 1622). If an additional intermediate cache remains, the intermediate cache index, i, may be incremented and the entry index, j, may be reinitialized (step 1624). Processing may then read the local intermediate cache(i) according to step 1608. When no additional intermediate caches remain for evaluation, the merge routine cycle may then end (step 1626).

The intermediate cache of each parsing engine may grow as intermediate caches are merged and forwarded up the binary tree 1400. For example, if each intermediate cache is one megabyte in size and there are 100 parsing engines in the system, the final cache may grow to 100 megabytes (or more depending on data structure overhead). This assumes that each intermediate cache references a distinct set of database objects. The cache size growth will be retarded if one or more database objects are referenced in two or more intermediate caches because the separate cache entries for the same database object are merged by the system.

At step 1614, the system updates the entry in the local intermediate cache that references the same database object as the cache entry(j). In an example system, updating the local intermediate cache includes incrementing the access count 704 of the entry in the local intermediate cache by the access count 704 of the cache entry(j). In the example system, updating the local intermediate cache also includes updating the last-accessed timestamp 706 for the local intermediate cache entry to reflect the later of the last-accessed timestamp 706 of the local intermediate cache entry of the parent parsing engine's local intermediate cache or the last-accessed timestamp 706 of the cache entry(j).

Returning to FIG. 15, at step 1506, the parsing engine forwards its local intermediate cache to its parent parsing engine node. If the parsing engine has one or more children parsing engine nodes, forwarding of the parsing engine's intermediate cache is not executed until the one or more children's intermediate caches are consolidated into the parsing engine's local intermediate cache. Because a parent will not forward its local intermediate cache until it has merged its children's intermediate caches, the children must forward their local intermediate caches, even if empty, or signal their parent that their caches are empty.

After the local intermediate caches are flushed, new local intermediate caches are created on each parsing engine. This allows each parsing engine to continue collecting database-object-use statistics while the intermediate caches are merged and forwarded.

Figure 17:
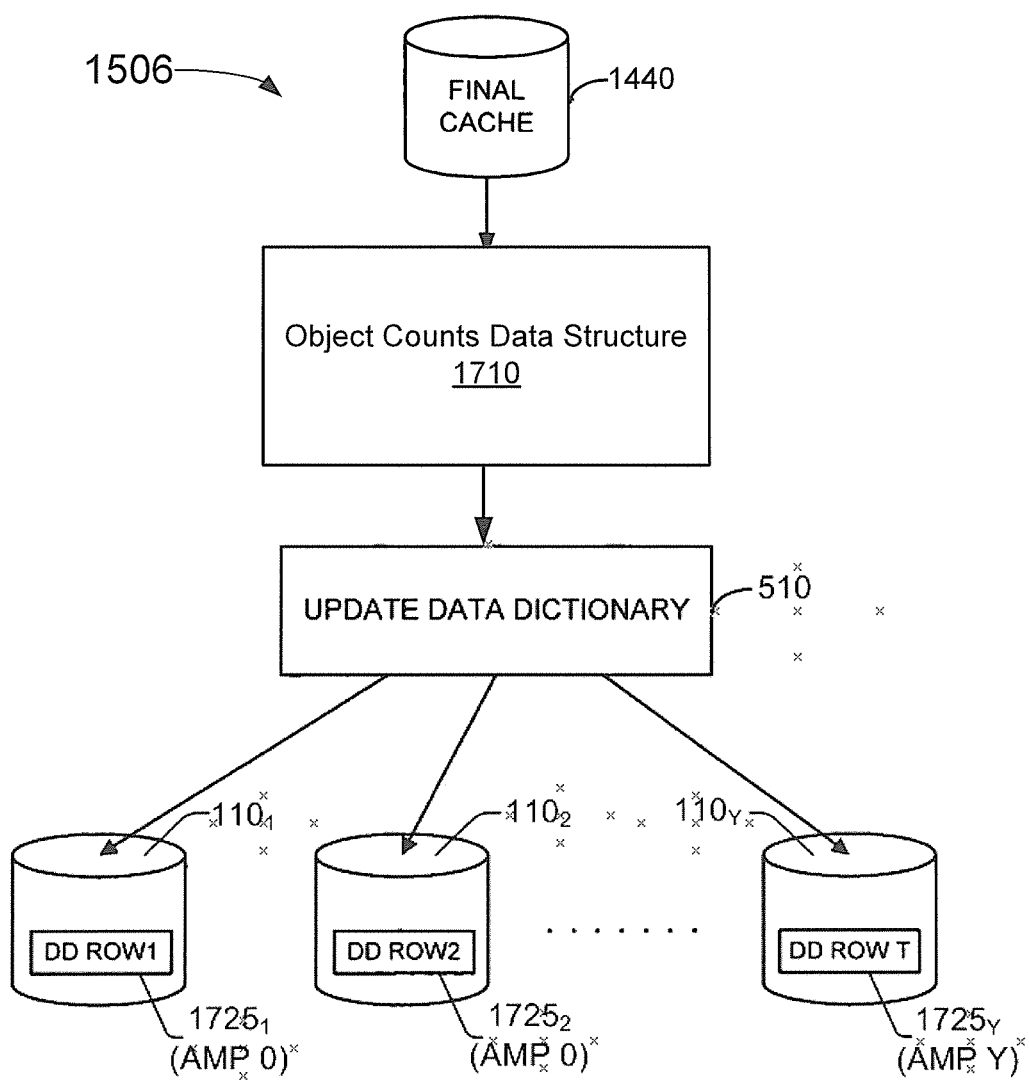
FIG. 17 depicts a diagrammatic representation of an exemplary system for updating the data dictionary in accordance with disclosed embodiments.
Figure 18:
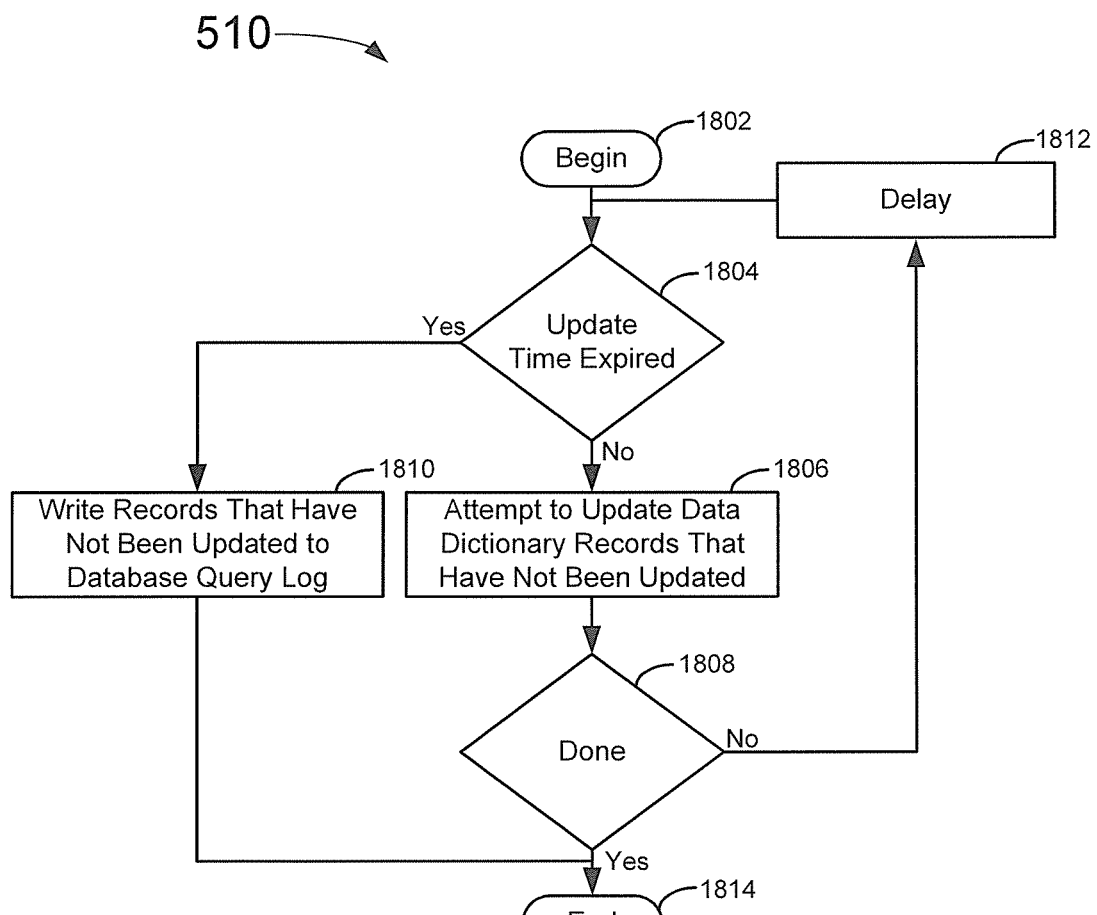
FIG. 18 is a flowchart of an exemplary data dictionary update routine implemented in accordance with an embodiment.

Returning again to FIG. 5, at step 510, the system updates the database-object-use data dictionary ("data dictionary"). An example system 1700 for updating the data dictionary is shown in FIG. 17. The system generates a data structure 1710 (described more fully herein below with reference to FIG. 19) for grouping database object access counts on a per access module processor basis from the final cache 1440. The system updates the data dictionary (step 510), which is shown in greater detail in FIG. 18). In some example systems, the amount of time for updating the data dictionary is limited. In those systems, if the system fails to update the data dictionary in the limited amount of time the update and an error message are written to a database query log. In another example system, if the dictionary cannot be updated in the limited amount of time, additional processes may be spawned to enable the system to perform more dictionary updates. The additional processes may also assist in merging and forwarding the intermediate caches up the binary tree 1400. In one example system, the additional processes are spawned in response to system load levels (e.g., processor, memory, or disk usage reaching or exceeding a load level).

The structure of the data dictionary will now be discussed. The data dictionary stores the usage statistics for database objects in one or more records, each representing a single database object. The data dictionary may span one or more tables in a database. One example data dictionary stores statistics for all database objects in a single table. In another example data dictionary, different tables are used based on the type of the database object (e.g., column, table, row, trigger, view, or stored procedure). One example data dictionary has a USE COUNT column for recording the accumulated access count for each database object. The example data dictionary further includes a LAST-ACCESS-TIME STAMP column for recording the last time the object was used. In the example data dictionary, each record occupies one row in one of the one or more data dictionary tables. For example, returning again to FIG. 17, the data dictionary has Y data dictionary rows $1725_{1...Y}$ that are stored across the data-storage facilities $110_{1...Y}$. The advantage of storing the statistics in a data dictionary, rather than in a flat file or other data structure, is faster information retrieval. For example, if the system is trying to determine an access count for an arbitrary database object and the accesses are individually stored in a flat file, the system will have to scan thorough the entire flat file and tabulate all of the access counts for the arbitrary database object. If the pre-aggregated statistics are stored in a data dictionary, the system will retrieve a record in the data dictionary for the arbitrary database object and read the access count recorded in the record. For example, the optimizer 122 may use the data dictionary to adjust selectivity estimates based on object usage counts.

Referring again to FIG. 17, in block 510, the system updates the data dictionary entries. An exemplary data dictionary update routine implemented in accordance with disclosed embodiments is depicted by the flowchart 510 in FIG. 18. The update routine is invoked (step 1802), and the system determines whether an update time has expired (step 1804). If the update time has not expired, the system attempts to update records in the data dictionary that have not been updated (step 1806). The system determines whether the update of the data dictionary is complete (step 1808). If the update of the data dictionary is complete, the update routine cycle ends (step 1814). If the update of the data dictionary is not complete, the system delays (step 1812) and returns to evaluate whether the update time has expired according to step 1804.

Returning again to step 1804, if it is determined that the update time has expired, the system writes the records that have not been updated to the database query log (step 1810) and the update routine cycle ends according to step 1814.

At step 1804, the system determines if the update time has expired. In one example system for updating the data dictionary, the update time may be set by the user or it may be a system default. Because there may be multiple instances of the system attempting to update the data dictionary, it may be necessary to forego one or more updates that are not able to finish within the update time. This behavior is useful when the statistics collection is a low priority task, relative to other tasks running on the DBS. In those situations, allowing the system to time out frees system resources for other tasks. At step 1806, the system attempts to update data dictionary records that have not been updated. One example system for attempting to update records attempts to gain a row lock for each of the records in the data dictionary that need to be updated. The example system uses session, request, and transaction numbers as the lock identifier. The system then updates only those records that it was able to successfully lock. The system will attempt to update the records that could not be locked the next time the system returns to step 1806, unless the update time expires first. Only updating the records that the system has locked allows multiple instances of the data dictionary updates to run simultaneously. Because only one of the instances can secure a lock for any record, there is no danger that multiple instances of the data dictionary update will write to the same record at the same time. This locking functionality allows the multiple instances of data dictionary updates to run simultaneously without coordination between the instances.

In step 1810, the system writes the records that were not updated to the database query log. The database query log may include any data structure that can record the unperformed updates. In one example system, the database query log includes a table in the DBS. Unlike the data dictionary, where usage statistics are updated, usage statistics are inserted into the database query log. In another example system, the database query log includes a flat file and unrecorded updates are written to the file. The database query log gives the database administrator access to all update information. In other example systems, step 1810 may be omitted and unrecorded updates are lost. If usage statistics are not important to a database administrator, this is a reasonable option to free system resources.

Figure 19:
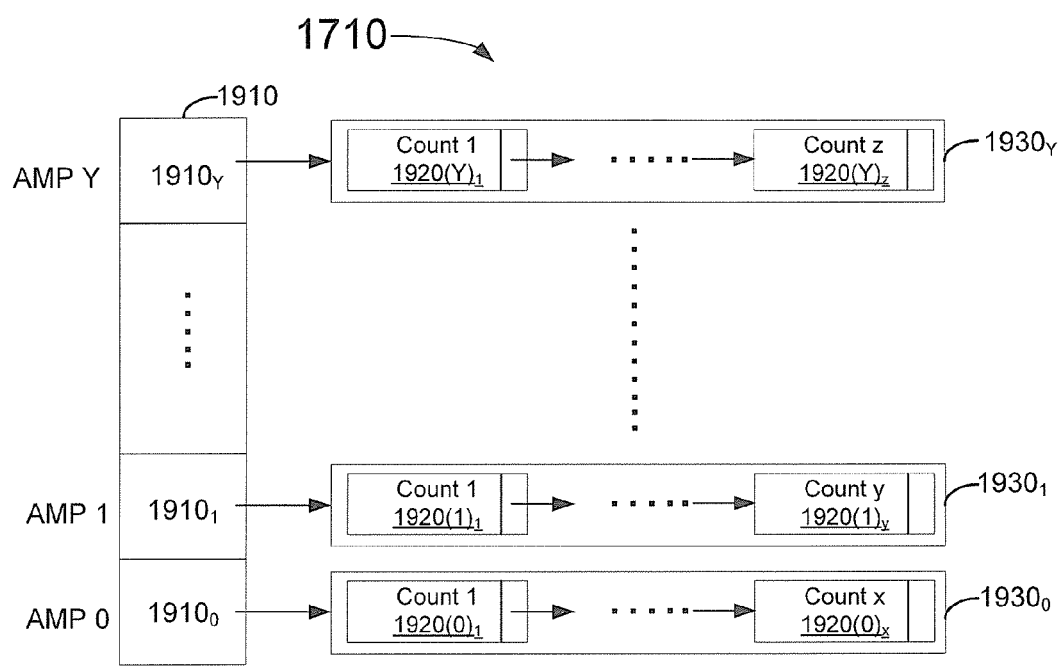
FIG. 19 is a diagrammatic representation of a data structure for grouping database object access counts on a per access module processor basis in accordance with an embodiment.

FIG. 19 is a diagrammatic representation of a data structure 1710 for grouping database object access counts on a per AMP basis in accordance with an embodiment. The data structure 1710 is generated by the root parsing engine 1402 after receipt of the intermediate caches from its child parsing engine 1404-1406 nodes and merging of the received intermediate caches with the root parsing engines intermediate cache.

The data structure 1710 includes an array 1910 of head elements 1910$_0$-1910$_Y$ each associated with a respective processing module (e.g., AMPs illustratively designated AMP 0-AMP Y). Each head element 1910$_0$-1910$_Y$ is first initialized, e.g., with null values. The intermediate cache data structure 600 of the root parsing engine is then accessed. The intermediate cache data structure 600 of the root parsing engine includes object access counts for all child node parsing engines (and child nodes thereof) that have forwarded their respective intermediate caches (with merged child cache results) to their parent parsing engine.

The root parsing engine accesses a first hash table, e.g., table 610, of the root parsing engine's intermediate cache 600 and begins traversing the linked list of entries, e.g., entries 610*a*-610*b*, of the table. For each entry, the parsing engine identifies an AMP associated with the object for which the entry specifies a count, e.g., by way of a hash bucket-to-AMP mapping table. A count entry for the object is then added to the data structure 1710 for the identified AMP. If the count entry is a first object access count for a particular AMP, the count entry is linked with the corresponding head element. Subsequent count entries for the AMP are linked to the most recently added count entry. In this manner, a linked list of count entries is generated for each AMP. For example, count entries 1920(0)$_1$-1920(0)$_x$ are associated with the AMP 0 via the linking of entry 1920(0)$_1$ with the head element 1910$_0$. In a similar manner, a linked list of count entries 1920(1)$_1$-1920(1)$_y$-1920(Y)$_1$-1920(Y)$_z$ are each associated with respective AMPs (illustratively designated AMP 1-AMP Y). In this manner, respective messages comprising data blocks 1930$_0$-1930$_Y$ may be forwarded to corresponding AMPs (AMP 0-AMP Y) to thereby provide a system-wide object access count for database objects accessible by each of the AMPs. In an alternative embodiment, messages 1930$_0$-1930$_Y$ may each be implemented as respective hash tables to speed up the aggregation process.

Figure 20:
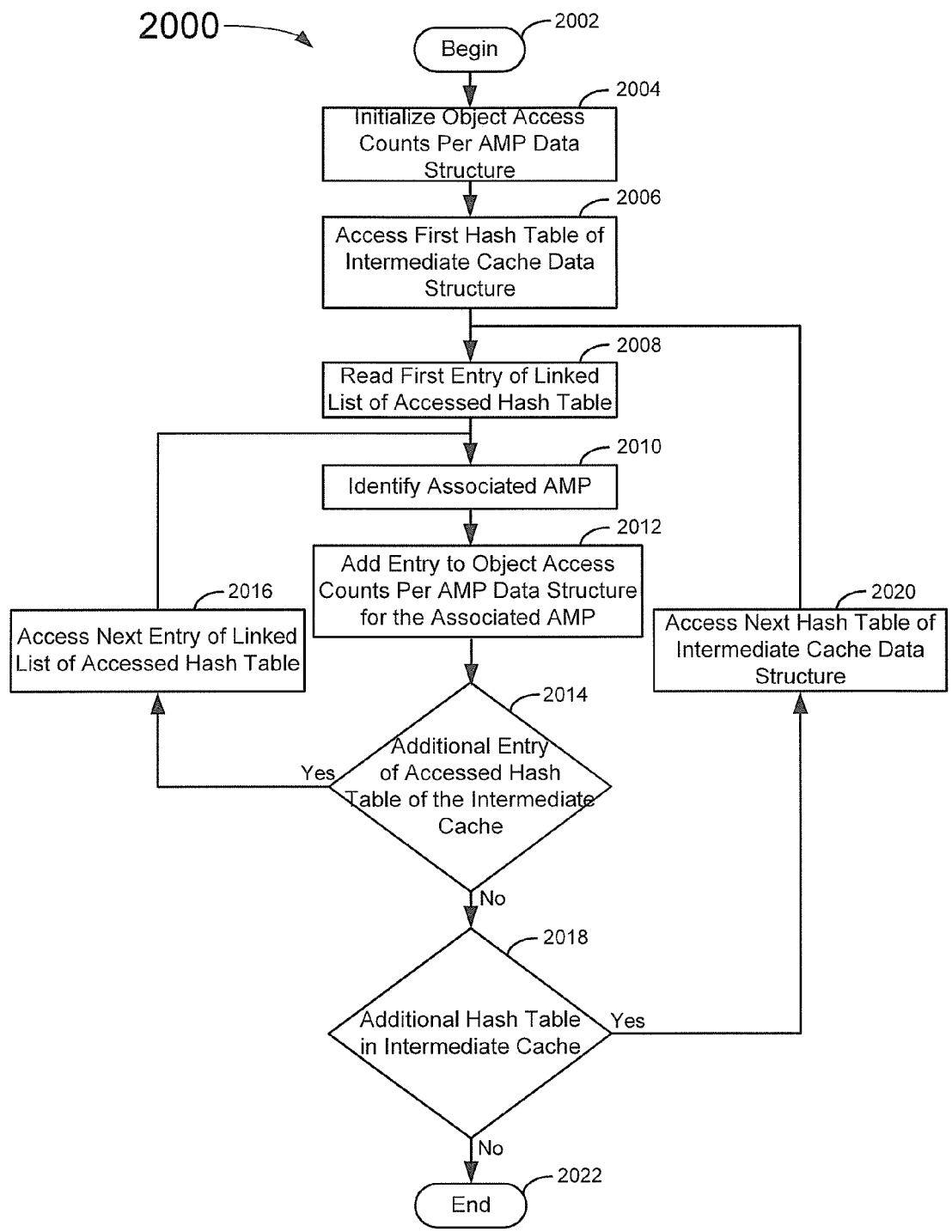
FIG. 20 is a flowchart that depicts processing of an object access counts per processing module data structure generation routine implemented in accordance with an embodiment.

FIG. 20 is a flowchart 2000 that depicts processing of an object access counts per AMP data structure 1710 generation routine implemented in accordance with an embodiment. The processing steps of FIG. 20 may be implemented as computer-executable instructions tangibly embodied on a computer-readable medium executable by a processing system, such as the processing module 140 depicted in FIG. 1.

The data structure generation routine is invoked (step 2002), and an object access counts per AMP data structure 1710 is initialized (step 2004). For example, an array 1910 may be generated with nullified head entries 1910$_0$-1910$_{n-1}$ allocated for each AMP. A first hash table, e.g., table 610, of the root parsing engine's intermediate cache data structure 600 may then be accessed (step 2006), and a first entry, e.g., entry 610*a*, of the linked list of entries of the accessed table may then be accessed (step 2008). An AMP associated with the object for which the accessed entry is allocated is then identified (step 2010), and an entry is added to the object access counts per AMP data structure is added for the identified AMP (step 2012). For example, assuming an AMP 0 is identified as associated with the entry 610*a* of the intermediate cache, an entry for the object is added to the data block 1930$_0$ allocated for the identified AMP 0.

An evaluation may then be made to determine if any additional entries of the access hash table of the intermediate cache data structure remain for evaluation (step 2014). If an additional entry remains in the accessed table, the next entry of the linked list of the accessed table is accessed (step 2016), and processing returns to identify an associated AMP according to step 2010. If no additional entries remain in the linked list of the currently access hash table, an evaluation may then be made to determine if an additional hash table remains in the root parsing engines intermediate cache data structure 600 (step 2018). If an additional table remains, the next table is accessed (step 2020), and a first entry of the linked list of the accessed table is read according to step 2008. When no additional tables remain to be evaluated in the root parsing engine's intermediate cache data structure, the data structure generation routine cycle may end (step 2022).

As described, mechanisms that facilitate fast and efficient grouping of database object access counts per processing module in a parallel processing system are provided. Each processing module manages an intermediate cache allocated thereto that stores database object access counts local to the respective processing module. The processing modules are configured in a hierarchical configuration and processing modules at the lowest level of the configuration forward their respective intermediate cache to a processing module configured as a parent to the respective processing module. On receipt of intermediate cache(s) from lower level processing modules, a processing module merges the received intermediate caches with the intermediate cache allocated to the processing module. The process is iteratively repeated until a root processing module receives the intermediate caches from processing modules configured as child nodes thereto. The root processing module merges the received intermediate cache(s) with the root processing module's intermediate cache thereby generating a final cache. An objects access count per processing module data structure is then generated by the root processing module. The object access count per processing module data structure includes data blocks of object access counts where each data block is associated with a particular processing module. The data blocks may then be forwarded to the associated processing modules which will sort the data and update the data dictionary table.

The flowcharts of FIGS. 3-5, 13, 15, 16, 18, and 20 depict process serialization to facilitate an understanding of disclosed embodiments and are not necessarily indicative of the serialization of the operations being performed. In various embodiments, the processing steps described in FIGS. 3-5, 13, 15, 16, 18, and 20 may be performed in varying order, and one or more depicted steps may be performed in parallel with other steps. Additionally, execution of some processing steps of FIGS. 3-5, 13, 15, 16, 18, and 20 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method for caching database usage statistics regarding a database, the database having a plurality of database objects, the method comprising:
    storing, by each of a plurality of processing modules configured in a hierarchical structure, information regarding accesses to a subset of the database objects by the respective processing module in an intermediate cache, wherein each of the processing modules has at least one processing module configured as a parent processing module or a child processing module;
    iteratively forwarding and merging intermediate caches of processing modules of a lower level of the hierarchical structure to a processing module at a higher level of the hierarchical structure;
    receiving, by a root processing module with no parent processing module, at least one merged intermediate cache;
    merging the received merged intermediate cache with an intermediate cache of the root processing module to produce a final cache of information regarding accesses to the database objects; and
    generating, by the root processing module, an object access counts data structure that comprises data blocks each respectively comprising entries of access counts of database objects accessible on a per processing module basis.

2. The method of claim 1, further comprising forwarding, by the root processing module, each of the data blocks to a respective processing module associated therewith.

3. The method of claim 1, wherein iteratively merging intermediate caches comprises:
    evaluating, by a first processing module, an entry of a second intermediate cache allocated to a second processing module;
    identifying a database object for which the entry maintains an access count; and
    determining, by the first processing module, that a first intermediate cache allocated to the first processing module includes an entry associated with the database object, wherein the second intermediate cache has been forwarded to the first processing module by a second processing module configured as a child processing module to the first processing module.

4. The method of claim 3, wherein determining that a first intermediate cache includes an entry associated with the database object comprises determining the first intermediate cache does not include an entry associated with the database object, the method further comprising adding an entry to the first intermediate cache comprising access count information of the second intermediate cache entry.

5. The method of claim 3, wherein determining that a first intermediate cache includes an entry associated with the database object comprises determining the first intermediate cache includes an entry associated with the database object, the method further comprising increasing an access count of the first intermediate cache entry by an access count of the second intermediate cache entry.

6. The method of claim 1, wherein generating an object access counts data structure comprises:
    reading each entry of the final cache, wherein each entry of the final cache includes an access count of a respective database object;
    identifying, for each entry of the final cache, at least one processing module associated with a database object for which the final cache entry maintains an access count; and
    adding an entry to the object access counts data structure in a data block associated with the identified at least one processing module for each final cache entry.

7. The method of claim 1, wherein each data block of the object access counts data structure comprises a respective linked list of entries each associated with a particular database object.

8. A computer-readable medium having computer-executable instructions for execution by a processing system, the computer-executable instructions for caching database usage statistics regarding a database having a plurality of database objects in a parallel processing system, the computer-executable instructions, when executed, cause the processing system to:
    store, by each of a plurality of processing modules configured in a hierarchical structure, information regarding accesses to a subset of the database objects by the respective processing module in an intermediate cache, wherein each of the processing modules has at least one processing module configured as a parent processing module or a child processing module;

iteratively forward and merge intermediate caches of processing modules of a lower level of the hierarchical structure to a processing module at a higher level of the hierarchical structure;

receive, by a root processing module with no parent processing module, at least one merged intermediate cache;

merge the received merged intermediate cache with an intermediate cache of the root processing module to produce a final cache of information regarding accesses to the database objects; and generate, by the root processing module, an object access counts data structure that comprises data blocks each respectively comprising entries of access counts of database objects accessible on a per processing module basis.

9. The computer-readable medium of claim 8, further comprising instructions that, when executed, cause the processing system to forward, by the root processing module, each of the data blocks to a respective processing module associated therewith.

10. The computer-readable medium of claim 8, wherein the instructions that iteratively merge intermediate caches further comprise instructions that, when executed, cause the processing system to:

evaluate, by a first processing module, an entry of a second intermediate cache allocated to a second processing module;

identify a database object for which the entry maintains an access count; and determine, by the first processing module, that a first intermediate cache allocated to the first processing module includes an entry associated with the database object, wherein the second intermediate cache has been forwarded to the first processing module by a second processing module configured as a child processing module to the first processing module.

11. The computer-readable medium of claim 10, wherein the instructions that determine that a first intermediate cache includes an entry associated with the database object determine the first intermediate cache does not include an entry associated with the database object, the computer-readable medium further comprising instructions that, when executed, cause the processing system to add an entry to the first intermediate cache comprising access count information of the second intermediate cache entry.

12. The computer-readable medium of claim 10, wherein the instructions that determine that a first intermediate cache includes an entry associated with the database object determine the first intermediate cache includes an entry associated with the database object, the computer-readable medium further comprising instructions that, when executed, cause the processing system to increase an access count of the first intermediate cache entry by an access count of the second intermediate cache entry.

13. The computer-readable medium of claim 8, wherein the instructions that generate an object access counts data structure further comprise instructions that, when executed, cause the processing system to:

read each entry of the final cache, wherein each entry of the final cache includes an access count of a respective database object;

identify, for each entry of the final cache, at least one processing module associated with a database object for which the final cache entry maintains an access count; and add an entry to the object access counts data structure in a data block associated with the identified at least one processing module for each final cache entry.

14. The computer-readable medium of claim 8, wherein each data block of the object access counts data structure comprises a respective linked list of entries each associated with a particular database object.

15. The computer-readable medium of claim 8, wherein an intermediate cache comprises a data structure including a plurality of tables each including a linked list of entries, wherein each table is associated with a particular database object type selected from the group of a user defined aggregate function, a user defined aggregate STAT function, a security authorization, a column, a database, a hash index, an index, a join index, a journal, a macro, an unknown type, a stored procedure, a user defined STAT function, a table, a table function, a temporary, a trigger, a user defined function, a user defined method, a user defined type, a view, a volatile, and an external stored procedure.

16. A parallel processing system configured to cache database usage statistics regarding a database having a plurality of database objects, comprising:

at least one storage facility on which a database table is stored; and a plurality of processing modules arranged in a hierarchical structure each allocated a respective portion of the database table of which the processing module can access database objects, wherein each processing module stores information regarding accesses to database objects by the respective processing module in an intermediate cache, iteratively forwards and merges intermediate caches of processing modules of a lower level of the hierarchical structure to a processing module at a higher level of the hierarchical structure, wherein a root processing module receives at least one merged intermediate cache and merges the received merged intermediate cache with an intermediate cache of the root processing module to produce a final cache of information regarding accesses to the database objects, and generates an object access counts data structure that comprises data blocks each respectively comprising entries of access counts of database objects accessible on a per processing module basis.

17. The system of claim 16, wherein each of the plurality of processing modules comprises a respective access module processor.

18. The system of claim 16, wherein the root processing module forwards each of the data blocks to a respective processing module associated therewith.

19. The system of claim 16, wherein a first processing module evaluates an entry of a second intermediate cache allocated to a second processing module, identifies a database object for which the entry maintains an access count, and determines if a first intermediate cache allocated to the first processing module includes an entry associated with the database object, wherein the second intermediate cache has been forwarded to the first processing module by a second processing module configured as a child processing module to the first processing module.

20. The system of claim 16, wherein each data block of the object access counts data structure comprises a respective linked list of entries each associated with a particular database object.

* * * * *